United States Patent [19]

Jinkins et al.

[11] Patent Number: 5,073,068
[45] Date of Patent: Dec. 17, 1991

[54] PECK FEED DRILLING MACHINE
[75] Inventors: Danny R. Jinkins; Douglas D. Doeden, both of Hicksville, Ohio
[73] Assignee: Doler Inc., Hicksville, Ohio
[21] Appl. No.: 605,141
[22] Filed: Oct. 24, 1990

Related U.S. Application Data
[63] Continuation of Ser. No. 528,153, May 24, 1990, abandoned.
[51] Int. Cl.$^5$ .................. B23B 47/22; B23B 47/34
[52] U.S. Cl. ...................... 408/17; 408/130; 408/702
[58] Field of Search ............ 408/14, 17, 56, 59, 408/130, 702; 173/4, 10, 11

[56] References Cited
U.S. PATENT DOCUMENTS

| | | |
|---|---|---|
| 2,657,595 | 11/1953 | Shaff . |
| 2,852,965 | 9/1958 | Wallace ........................... 408/17 |
| 3,351,047 | 11/1967 | Baker ............................... 125/20 |
| 3,512,433 | 5/1970 | Juhasz et al. . |
| 3,609,054 | 9/1971 | Nyman ............................ 408/17 |
| 3,663,138 | 5/1972 | Petroff ............................ 408/130 |
| 3,680,970 | 8/1972 | Deschner ......................... 408/17 |
| 3,704,957 | 12/1972 | Petroff ............................ 408/129 |
| 4,123,188 | 10/1978 | Deremo et al. ................. 408/17 |
| 4,288,182 | 9/1981 | Vandenkieboom et al. ... 408/129 |
| 4,350,212 | 9/1982 | Hirose .............................. 173/6 |
| 4,362,444 | 12/1982 | Watkins ........................... 408/17 |
| 4,421,441 | 12/1983 | Hirose ............................. 408/17 |
| 4,534,682 | 8/1985 | Carlson ........................... 408/130 |
| 4,688,970 | 8/1987 | Eckman ........................... 408/9 |
| 4,961,675 | 10/1990 | Stewart ............................ 408/17 |

Primary Examiner—Daniel W. Howell
Attorney, Agent, or Firm—Willian Brinks Olds Hofer Gilson & Lione

[57] ABSTRACT

A peck feed drilling machine incorporates a pneumatically operated vane motor and peck feed components. The vane motor drives a conventional drill bit through a speed reducing gear train. The peck feed assembly includes a plurality of multi-state shuttle valves which cooperate with a drilling feed piston, a peck piston and a clutch assembly to incrementally advance and fully retract the drill bit to peck drill an aperture. The drilling machine also includes a dashpot which adjusts the feed rate of the drill bit, a second dashpot for slowing the drill bit as it breaks through the workpiece and countersinks, a threaded mechanism for adjusting the depth of drilling and a spring mechanism for slowing the advance of the drill bit just before it engages the workpiece.

40 Claims, 6 Drawing Sheets

PECK FEED DRILLING MACHINE

CROSS-REFERENCE TO COPENDING APPLICATION

This application is a continuation of Ser. No. 07/528,153, filed May 24, 1990, now abandoned.

BACKGROUND OF THE INVENTION

The invention relates generally to peck feed drilling equipment and more specifically to an automatic drilling machine which peck drills an opening by repeatedly advancing a drill bit into the work, drilling a short distance, fully retracting the drill bit, repeating this cycle until drilling is completed and then shutting off.

Accompanying the development of various machines and apparatus for drilling holes was a similar effort directed to associated equipment for providing and controlling drilling programs to ensure that the drilling operation was accomplished most expeditiously. Typically, such programs sought to provide the best and most uniform aperture with the least drill bit wear. For example, U.S. Pat. No. 2,657,595 teaches a drilling tool which utilizes a pressurized fluid controlled feed mechanism having a rapid approach, a controlled feed movement of a predetermined length and a rapid return of the tool to it starting position. U.S. Pat. No. 3,351,047 illustrates an apparatus in which a rotating cam having a follower coupled through cables provides a repetitively applied controlled force to a rotating tool for drilling, polishing and the like.

One approach to improving drilled aperture quality is to remove the feed rate variable from operator control and accomplish it automatically through the agency of the drilling mechanism. In U.S. Pat. No. 3,512,433 a positive feed drill is disclosed wherein an air motor drives both the drill spindle and the axial feed mechanism. Accordingly, a fixed nominal drive ratio exists between the rotation of the drill and its axial translation. Fluid operated brakes and clutches control the direction and axial speed of the drill. U.S. Pat. No. 3,663,138 also discloses a drilling mechanism wherein the drill bit is rapidly advanced to proximity with the workpiece and then slowly fed into the workpiece. Here, the axial motion of the drill is accomplished by a pair of interconnected, double-acting pistons.

A hole drilling program which provides excellent repeatability, concentricity and overall accuracy is the peck feed drilling method. Peck feed refers to a drilling program wherein a drill bit engages a workpiece and drills a short increment. The drill bit is then fully retracted and subsequently advanced into the workpiece to repeat the cycle and drill another short increment. Openings drilled by this advance, drill, retract, repeat cycle exhibit improved accuracy and concentricity, primarily because distortion of the workpiece caused by elevated workpiece temperature and chip machining of the aperture are both reduced. Accordingly, there are several machines and patents directed thereto which accomplish automatic or semi-automatic peck feed drilling.

For example, U.S. Pat. No. 3,704,957 discloses a mechanically operated and controlled peck feed assembly utilizing a cam and crank arm which axially reciprocates a drive motor and drill bit. A compression spring limits the axial force which can be applied to the drill bit.

Another peck feed drilling apparatus is illustrated in U.S. Pat. No. 4,350,212. This device includes a motor which operates a quill and drill bit through a speed reduction device and splined interconnection. The peck feed components include a hydraulic feed control device and a ratchet mechanism which cooperates with a feed control device to provide peck feed operation.

U.S. Pat. No. 4,362,444 presents another peck feed drill assembly having a cam operated advance and retract mechanism. The drill assembly includes a first motor which provides rotating power to the drill bit and a second which axially positions the drill bit. Accordingly, independent drill speeds and feed rates are possible.

A review of the foregoing prior art patents reveals that the basic concept of peck feed drilling and equipment for accomplishing such drilling are old. However, there are several aspects and problems of peck feed drilling which are neither acknowledged nor addressed by the prior art. For example, breakthrough of a drill upon hole completion is a critical operation because at a normal drilling force, the drill bit may break and tear through a small remaining portion of a work piece. One end of the drilled bore may thus be rough, incorrectly sized or non-circular. When such breakthrough occurs just as the drill bit commences a peck feed drill cycle, the breakthrough can be especially rapid, uncontrolled and damaging. The motor may also stall, necessitating backing the drill bit out of the hole and possibly restarting the drilling cycle. One approach to reducing such breakthrough damage is to operate the drill at a reduced feed rate throughout the drilling cycle. However, this is inefficient as the drilling operation will then take substantially longer than it would have if the drill were operated at an optimum feed rate throughout the drilling cycle.

Another difficulty unique to peck feed drilling assemblies is the impact of the drill bit against the bottom of the drilled hole in the work piece at the commencement of each drilling cycle. Once again, one solution to this problem has been to slow translation of the drill bit throughout the entire advance cycle. Unfortunately, this solution has the same consequence as above which is to slow the entire drilling process and thus render the overall drilling process more costly and less efficient.

A third problem inherent in some prior art drilling machines relates to the manner of controlling the peck drilling distance. In units which peck drill for a selected time interval, the distance drilled will be a function of the applied force, the drill speed, the material hardness, the hole depth and the drill sharpness. Given the variability of these parameters, especially the last one, it is clear that the drilled distance may vary. A control system which integrates force over time to compute peck distance fares little better, again because of the variability of drill sharpness and other factors.

From the foregoing, it is apparent that improvements in the art of peck feed drilling machines are both possible and desirable.

SUMMARY OF THE INVENTION

A peck-feed drilling machine incorporates a pneumatically operated vane motor and peck feed components. The vane motor drives a conventional drill bit through one or more speed reducing gear trains selected to provide appropriate drill bit speed and torque. The peck-feed assembly includes a plurality of multistate shuttle valves which cooperate with a drilling feed piston, a peck piston and a clutch assembly to incrementally advance and fully retract the drill bit to peck drill an aperture. An adjustable viscous damper or dashpot provides a constant, though adjustable, resistance to the advancing (drilling) force provided by the pneumatic feed piston. A second adjustable dashpot provides adjustable resistance to the drill bit assembly as the drill bit nears breakthrough in the workpiece and during countersinking operations. The peck drill distance is sensed mechanically and adjustment is accomplished by a threaded screw. A spring mechanism provides a biasing force against the drill bit advancing mechanism as it nears the bottom of the opening in the workpiece just prior to commencing a new drilling cycle in each peck feed cycle. A depth of cut adjustment includes both coarse and fine adjustment mechanisms. The coarse adjustment mechanism includes a threaded stop and jam nut received within a complementally threaded cylinder. The fine adjustment mechanism comprehends a stub shaft defining two threaded regions having distinct pitches. One of the ends of the stub shaft is received within the threaded cylinder and the other end is threaded into the housing. Exceedingly accurate cutting depth adjustments may be made by rotating the threaded stub shaft. The drilling machine may be equipped with various chucks, collets and spindles such as Erickson collets or Jacobs chucks.

Thus, it is an object of the present invention to provide a pneumatically powered peck feed drilling machine.

It is a further object of the present invention to provide a pneumatically powered drilling machine which includes self-contained pneumatic peck feed control components.

It is a still further object of the present invention to provide a self-contained peck feed drilling machine having a drill bit which advances to the work piece, drills, fully retracts, repeats its drilling cycle until completed and automatically shuts off.

It is a still further object of the present invention to provide a peck feed drilling machine having a mechanism for slowing advancement of the drill bit just prior to engaging the previously drilled portion of a work piece.

It is a still further object of the present invention to provide a peck feed drilling machine having a mechanism for slowing advance of the drill bit as it approaches breakthrough in the workpiece.

It is a still further object of the present invention to provide a peck feed drilling machine wherein the peck drilling distance is controlled and adjusted by actual drilling distance.

It is a still further object of the present invention to provide a peck feed drilling machine wherein an adjustable dashpot provides resistance to a pneumatic feed piston to adjust the feed rate of the drill bit.

Further objects and advantages of the present invention will become apparent by reference to the following description of the preferred embodiment and appended drawings.

DESCRIPTION OF THE PREFERRED EMBODIMENT

Figure 1:
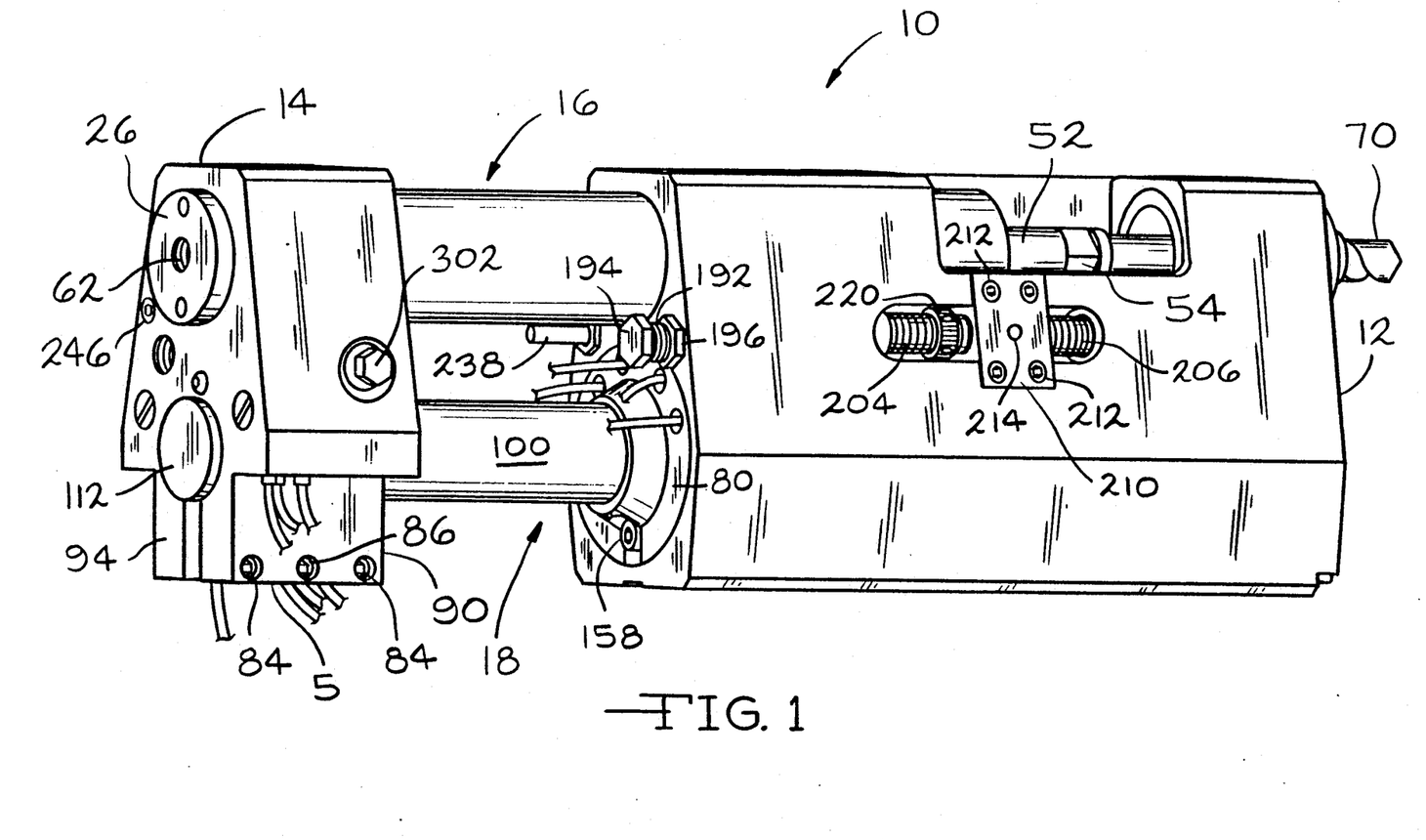
FIG. 1 is a perspective view of the right side of a peck feed drilling machine according to the present invention.
Figure 2:
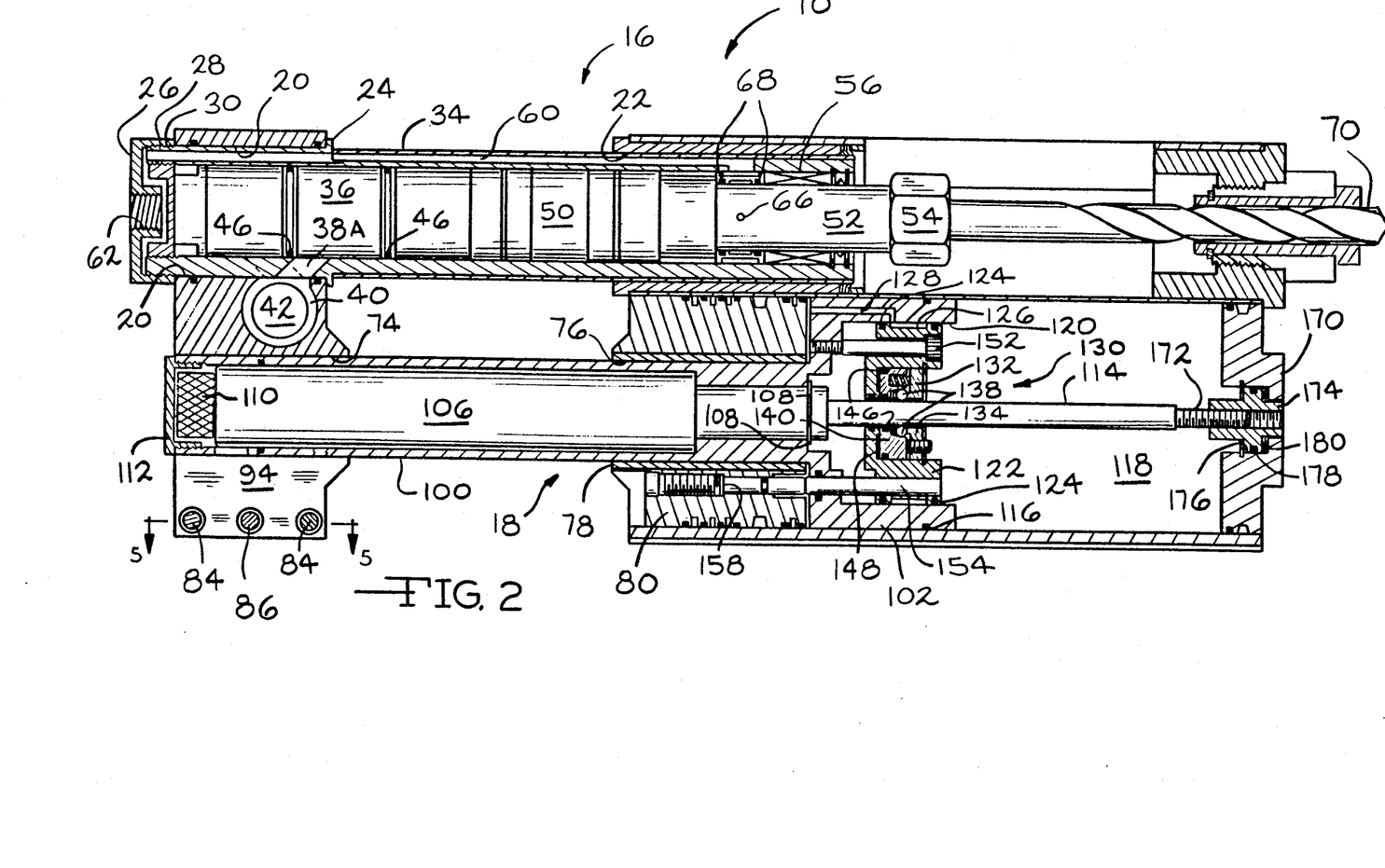
FIG. 2 is a full, sectional view of a peck feed drilling machine according to the present invention.

Referring now to FIGS. 1 and 2, a peck feed drilling machine according to the present invention is illustrated and generally designated by the reference numeral 10. The peck feed drilling machine 10 includes a front housing 12 and a small, rear housing 14. The front housing 12 and the rear housing 14 are preferably bar stock aluminum which is subsequently machined to receive the various components, passages and sub-assemblies of the peck feed drilling machine 10 as will be more fully described subsequently. Extending between the front housing 12 and the rear housing 14 is a cylindrical drill motor assembly 16 and a primary feed rate assembly 18 which is disposed parallel to and spaced from the cylindrical drill motor assembly 16. The cylindrical drill motor assembly 16 is securely received within a complementally sized aperture 20 extending through the rear housing 14 and is slidingly received within a slightly larger diameter complemental cylindrical passageway including a low friction sleeve 22 in the front housing 12. The cylindrical drill motor assembly 16 is securely retained in the rear housing 14 through cooperation of a shoulder 24 extending about the periphery of the drill motor assembly 16 and a circular end cap 26 having female threads 28 which are complemental to male threads 30 disposed on an end adjacent region of the drill motor assembly 16. It will be appreciated that the circular end cap 26 may be readily loosened to facilitate removal of the drill motor assembly 16 from the rear housing 14.

Figure 3:
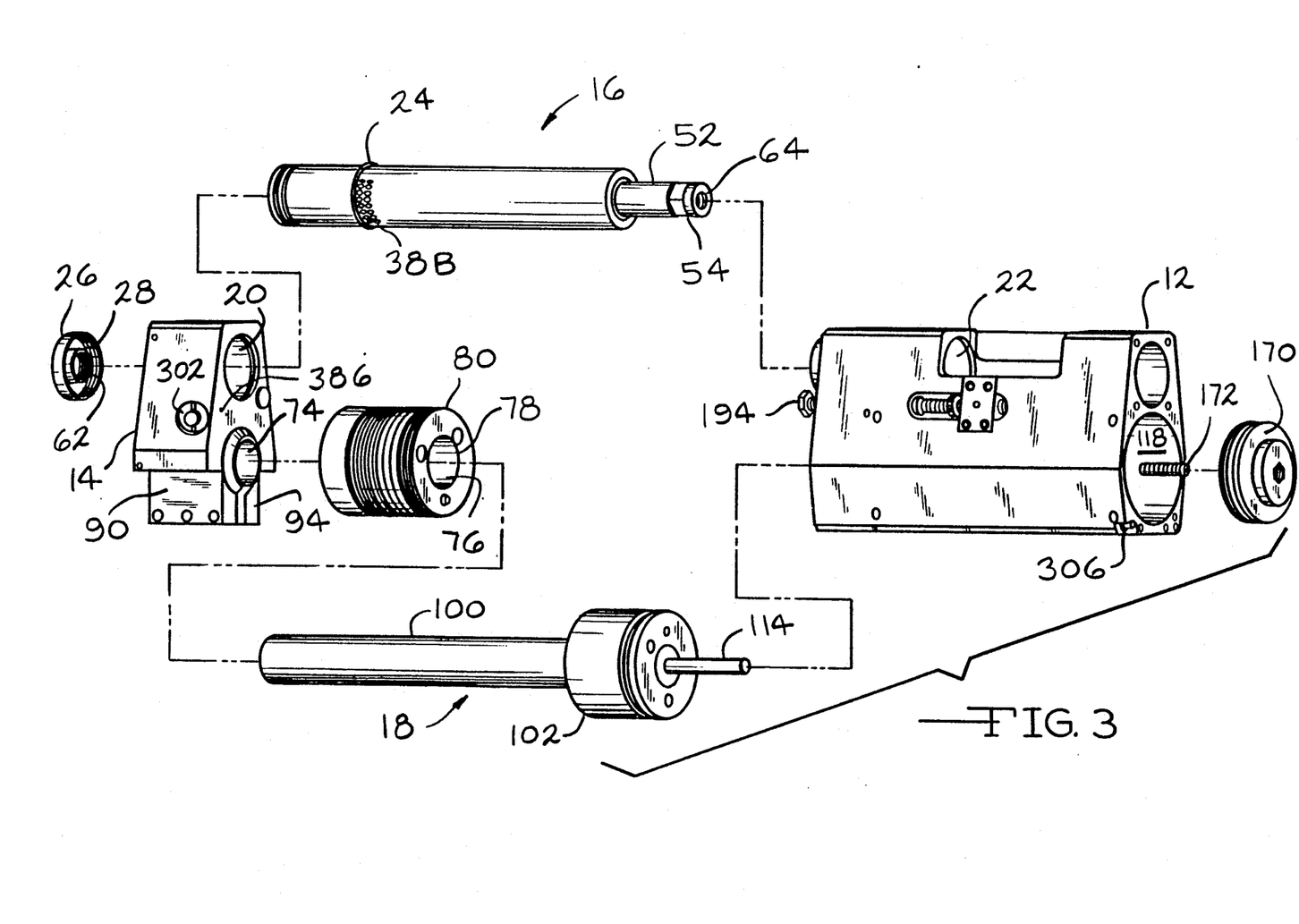
FIG. 3 is an exploded, perspective view of a peck feed drilling machine according to the present invention illustrating the major component assemblies thereof.

As illustrated in FIGS. 2 and 3, the cylindrical drill motor assembly includes an elongate cylindrical housing 34 which receives a conventional pneumatic vane motor 36. The elongate housing 34 includes ports 38A which facilitates supplying compressed air to the vane motor 36. A plurality of ports 38B facilitates exhausting air from the vane motor 36. The ports 38A align with a passageway 40 in the rear housing 14 which supplies compressed air to the vane motor 36 from an on-off valve shuttle 42. The on-off valve shuttle 42 will be described in more detail subsequently. O-ring seals 46 received on and extending about the cylindrical housing 34 direct and isolate the flows of compressed and exhaust air to the appropriate ports 38A and 38B, respectively, of the vane motor 36 as will be readily appreciated. The cylindrical drive motor assembly 16 further includes one or more speed reducing gear mechanisms 50 driven by the output of the vane motor 36 and arranged in series within the elongate cylindrical housing 34. It will be appreciated that various speed reduction assemblies 50 may be utilized to provide appropriate output speed of the spindle 52 and a correspondingly appropriate torque output level. The spindle 52 may be terminated by one of a number of appropriate chuck or collet assemblies 54 such as a Jacobson chuck or an Erickson collet. Once again, the specific application of the peck feed drilling machine 10 will determine the necessary and appropriate size and type of termination of the spindle 52. Preferably, the spindle 52 is supported for rotation by suitable roller bearings 56 disposed coaxially about the spindle 52 within the elongate housing 34. A double row ball bearing (not illustrated) supports the spindle 52 against axial thrust. The elongate cylindrical housing 34 also defines an axial through passageway 60 which extends from and communicates between a threaded lubrication port 62 in the circular end cap 26 to a region adjacent the spindle 52. The spindle 52 is hollow, defining a center lubrication passageway 64. A through, radially extending passageway 66, axially closed by seals 68, communicates between the center lubrication passageway 64 and the terminus of the axial passageway 60 in the elongate housing 34 thereby providing a lubrication passage from the threaded aperture 62 to the chuck or collet assemblies 54. A suitable hollow drill 70 may thus be provided with lubrication directly to its cutting tip.

Figures 4, 5:
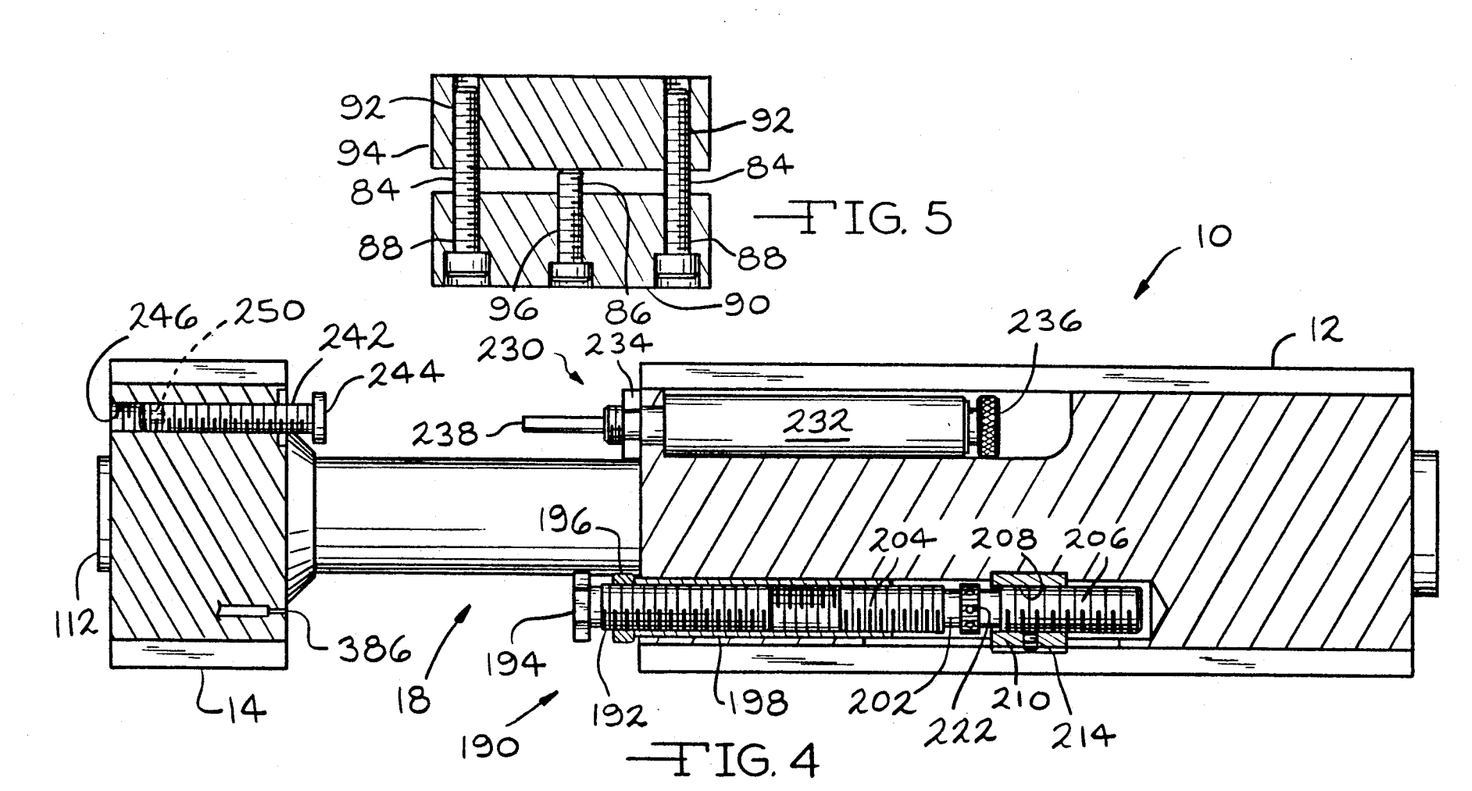
FIG. 4 is a full, sectional view of a peck feed drilling machine according to the present invention which illustrates the breakthrough dashpot assembly and the depth of cut assembly.
FIG. 5 is a fragmentary, sectional view of a portion of the rear housing taken along line 5—5 of FIG. 2.
Figure 6:
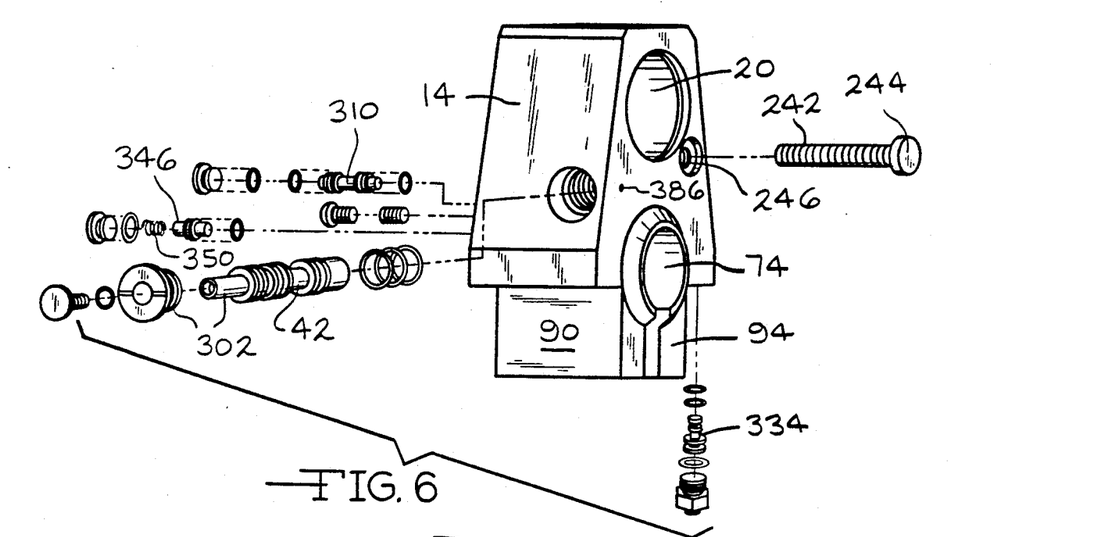
FIG. 6 is an exploded, perspective view of the rear housing of a peck feed drilling machine according to the present invention illustrating the on-off control valve and other components.
Figure 7:
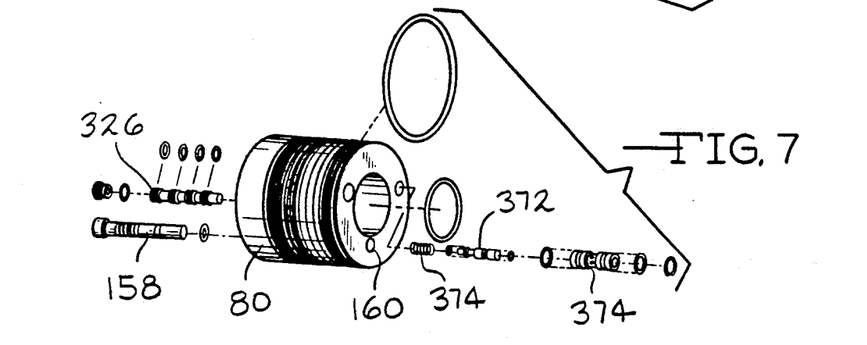
FIG. 7 is an exploded, perspective view of the bulkhead of a peck feed drilling machine according to the present invention illustrating additional valve components.

The primary feed rate assembly 18 is securely received within a complemental cylindrical opening 74 formed in the rear housing 14 and is slidingly received within an aligned, slightly larger complemental through passageway 76 defined by a low friction sleeve 78 disposed within a cylindrical bulkhead 80. The primary feed rate assembly 18 is selectively secured to and released from the rear housing 14 through the agency of a pair of threaded cap screws 84 and a third, intermediately disposed threaded cap screw 86. As illustrated in FIG. 5, the pair of threaded cap screws 84 extend through a respective one of a pair of smooth walled passageways 88 in the right portion 90 of the rear housing 14 and are received within complementally threaded blind apertures 92 in the left portion 94 of the rear housing 14. The center cap screw 86 is received within a complementally threaded through aperture 96 in the right portion 90 of the rear housing 14. The end of the center cap screw 86 abuts the internal face of the left portion 94 of the housing 14. The right portion 90 and the left portion 94 of the rear housing 14, in combination with the through passageway 74 define a yoke which selectively receives the primary feed rate assembly 18. Coarse stroke adjustment of the peck feed drilling machine 10 may be accomplished by loosening the pair of cap screws 84 and tightening the center cap screw 86 to expand the through passageway 74 of the rear housing 14. The primary feed rate assembly 18 may then be adjusted relative to the rear housing 14, the cap screw 86 backed out and the pair of cap screws 84 tightened to secure the primary feed rate assembly 18 to the rear housing 14.

As illustrated in FIGS. 2 and 3, the primary feed rate assembly 18 includes an elongate cylindrical housing 100 which is coupled to and integrally formed with a feed piston 102. The elongate housing 100 receives an adjustable dashpot 106 which is positively axially secured therein by a C-washer or similar retaining device 108. The adjustable dashpot 106 includes an adjustment knob 110 which is protected by removable threaded cover 112. The cover 112 also discourages tampering and unauthorized re-adjustment of a previously selected feed rate setting of the dashpot 106. The adjustable dashpot 106 includes an axially extending feed control rod 114. The dashpot 106, of the type referred to as a hydraulic feed control, includes an internal clutch mechanism (not illustrated) which, when activated, allows the feed control rod 114 to extend and, when deactivated, maintains it in the axial position to which it is moved.

The feed piston 102 includes an O-ring 116 about its periphery and is slidably and sealingly received within a cylindrical chamber 118 in the front housing 12. The feed piston 102 itself defines a circular cylinder 120 which slidably receives a peck piston 122. The peck piston 122 preferably includes a pair of O-ring seals 124 disposed in axially spaced relation on opposite sides of a circumferential groove 126. The circumferential groove 126 is in constant communication with a passageway 128 which extends to the pressurized face of the feed piston 102. A peck clutch assembly 130 is concentrically disposed within the peck piston 122.

Figure 8:
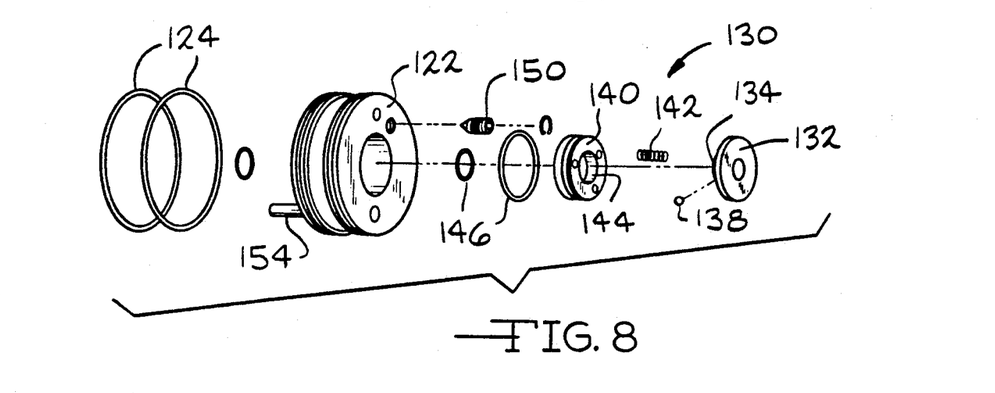
FIG. 8 is an exploded, perspective view of a peck piston and peck clutch of a peck feed drilling machine according to the present invention.

As illustrated in FIGS. 2 and 8, the peck clutch assembly 130 includes a clutch ball carrier 132 disposed about the feed control rod 114. The ball carrier 132 includes a neck region 134 having a plurality of radially extending apertures which receive a like plurality of ball bearings 138. A peck clutch piston 140 is spring-biased away from the ball carrier 132 by a plurality of compression springs 142. The peck clutch piston 140 includes an internal frusto-conical surface 144 which engages the ball bearings 138. O-rings 146 mounted in the peck clutch piston 140 sealingly engage the feed control rod 114 and the peck piston 122. When the ball carrier 132 and clutch piston 140 are forced together by air pressure applied to the face of the peck piston 140, the frusto-conical surface 144 drives the ball bearings 138 against the feed control rod 114, thereby locking the peck clutch assembly 130 and the peck piston 122 to the feed control rod 114. Operating force is supplied to the peck clutch piston 140 from compressed air within the circumferential groove 126 by a radial passageway (not illustrated) which extends between the circumferential groove 126 and the chamber 148. A setscrew valve 150, extending into such radial passageway, may be tightened to close off the passageway and inhibit peck feed operation of the drilling machine 10, if desired. The axial travel of the peck piston 122 relative to the feed piston 102 is limited by a threaded cap screw or similar fastener 152 which extends through the peck piston 122 and into the feed piston 102. A register pin 154 is securely affixed to the peck piston 122 and extends through a suitably sized and sealed aperture 156 in the feed piston 102. The register pin 154 aligns and cooperates with a threaded peck adjustment screw 158 which is received within a complementally threaded through aperture 160 in the bulkhead 80. The peck adjustment screw 158 mechanically and positively adjusts the peck drilling distance and may be rotated clockwise or counter-clockwise to lengthen or shorten, respectively, the distance drilled during each peck cycle.

Referring again to FIG. 2, there is illustrated a cylinder cap 170 which sealingly closes the cylindrical chamber 118. Centrally disposed within the cylinder cap 170 and axially aligned with the feed control rod 114, is a threaded screw 172 which is received within a hexagonal and therefore non-rotatable collar 174. The hexagonal collar 174 is retained within a complementally configured hexagonal opening in the end cap 170 by a retaining washer 176. An O-ring 178 seals the hexagonal collar 174 to the end cap 170. Disposed between opposed faces of the collar 174 and the end cap 170 is a Belleville washer 180. At the commencement of each drilling step of a peck feed drill cycle, the Belleville washer 180 cushions and slows the advance of the peck feed mechanism, specifically the drill bit, just prior to impact with the workpiece.

Referring now to FIGS. 1 and 4, the peck feed drilling machine 10 also includes a depth stop assembly 190 which is adjustable to set the depth of cut and countersink of the machine 10. The depth stop assembly 190 includes a rough primary adjustment mechanism having a threaded adjustment screw 192 with a flat, hexagonal head 194. The threaded screw 192 receives a complementally threaded jam nut 196 and is received within a complementally fully threaded cylindrical sleeve 198. The coarse or primary depth step adjustment is made simply by loosening the jam nut 196, rotating the threaded adjustment screw 192 to the extent that it properly limits the axial translation of the rear housing 14 relative to the front housing 12 and tightening the jam nut 196 against the cylindrical sleeve 198.

The depth stop assembly 190 also includes a secondary or fine cutting depth adjustment assembly having a dual threaded stub shaft 202. The dual threaded stub shaft 202 includes a first region of threads 204 of a first pitch which are complemental to the threads within the threaded cylindrical sleeve 198 and are received therein. At the opposite end of the stub shaft 202 are threads 206 of a second, distinct pitch having a sense the same as that of the threads 204. The threads 206 are received within a complementally threaded passageway 208 formed in a bushing plate 210 which is secured to the side of the front housing 12 by suitable fasteners 212. A locking set screw 214 may be adjusted to lock or release the stub shaft 202 as will be readily appreciated. Centrally disposed along the stub shaft 202 is a collar 220 having a plurality of circumferentially spaced apart radially extending blind apertures 222. The blind apertures 222 may be engaged by a suitable sized pin to rotate the stub shaft 202 bi-directionally. Due to the distinct lead of the two pitches of the threaded regions 204 and 206, the resolved axial travel of the stub shaft 202 will be the difference between such leads. Accordingly, exceptionally fine depth stop adjustments may be made by rotating the collar 220 and stub shaft 202 through an angular increment. For example, if the blind apertures are six in number and thus spaced sixty degrees apart suitable choices of the pitches of the threads 204 and 206 permit a repeatable, known adjustment of 0.001 inch per sixty degrees rotation of the stub shaft 202.

The peck feed drilling machine 10 also includes a secondary feed control assembly 230 having components disposed in both the front housing 12 and the rear housing 14. The secondary feed control assembly 230 includes an adjustable dashpot 232 which is mounted within the front housing 12 and secured there by a suitable threaded fastener 234. The dashpot 232 includes an adjustment knob 236 which may be readily manually adjusted to control the resistance provided by the dashpot 232. The dashpot 232 also includes a piston rod 238 which is aligned with a threaded adjustment screw 242 having a flat head 244. The threaded adjustment screw 242 is received within a complementally threaded through aperture 246 formed in the rear housing 14. The threaded adjustment screw 242 includes a hexagonal socket 250 in the end opposite the head 244 and in which a suitably sized Allen wrench may be utilized to engage the threaded adjustment screw 242 to advance and retract the flat head 244. The secondary feed control assembly 230 is utilized to provide additional resistance to slow the drilling feed rate of the peck feed drilling machine 10 as it nears completion or breakthrough of a drilling operation and/or countersinking thereof. The secondary feed control assembly 230 thus permits a higher drilling feed rate during the majority of the drilling operation in comparison to conventional equipment. This is a result of necessarily reducing the feed rate of conventional equipment which does not slow during breakthrough of the drill bit and must therefore operate at a reduced feed rate throughout the drilling cycle.

Returning now to FIGS. 2, 6, 7 and 9, the pneumatic control circuitry and thence the operation of the peck feed drilling machine 10 will be described. Pressurized shop air at a pressure of preferably about 90 p.s.i. is supplied in a line 300 to an on-off valve 302. The on-off valve 302 includes the on-off valve shuttle 42 previously noted. The on-off valve 302 includes an outlet port or passageway 40 which provides a selective flow of pressurized air to the pneumatic vane motor 36 and to auxiliary equipment such as lubrication supplying components of the peck feed drilling machine 10. The on-off valve 302 is illustrated in its off or non-operating position. As such, pressurized inlet air is also supplied through a line 304 to both a manual retract valve 306 and a shut-off valve 310. The manual retract valve 306 includes three spaced apart valve spools 312A, 312B and 312C which are biased to the position illustrated in FIG. 8 by a compression spring 314. One end of the manual retract valve 306 is vented to atmosphere through a vent 316 and the opposite end includes an actuator pin 318 which may be manually activated to retract the peck feed mechanism at any point in the operating cycle, if desired. A pneumatic line 320 couples the manual retract valve 306 with the chamber 118. The shut-off valve 310 includes a first spool 322A and a second spool 322B. The line 304 also communicates with a feed control valve 326. The feed control valve 326 includes a pair of vents 328 and also includes four spaced apart spools 330A, 330B, 330C and 330D. Finally, the line 304 communicates with the input of a pressure regulator 334. The pressure regulator 334 includes a shuttle having two smaller spools 336A and 336B and a larger spool 336C. The pressure regulator is vented to atmosphere through a port 338. The output of the pressure regulator is supplied in a line 340 to the primary feed rate assembly 18.

The pneumatic control circuitry also includes a retract shuttle valve 346. The retract shuttle valve 346 includes a shuttle 348 which is biased to the position illustrated in FIG. 9 by a compression spring 350. The retract shuttle valve 346 is coupled through a line 354, and through a flow restrictor 356 to a line 358 which connects to the feed control valve 326 and the on-off valve 302. The retract shuttle valve 346 is also coupled to the feed control valve 326 through a line 360 which extends from the end of the feed control valve 326 opposite the line 304 to a location proximate but behind the shuttle 348. The end of the retract shuttle valve 346 opposite the line 354 is coupled through a line 362 to a peck valve 366 disposed in the peck piston 102. The peck valve 366 communicates between the face of the feed piston 102 and the face of the peck piston 122 and is biased to a closed position by a compression spring 368. A full retract valve 370 includes a stem 372 which aligns with the face of the feed piston 102 and is activated thereby when the feed piston is in the fully retracted position illustrated in FIG. 9. A compression spring 374 biases the full retract valve 370 to its closed position when the feed piston 102 is moved away from its fully retracted position. A pneumatic line 376 couples the chamber containing the compression spring 374 with the cylindrical chamber 118. A pneumatic line 380 couples the region of the full retract valve 370 adjacent the stem 372 through a check valve 382 with the shut-off valve 310. The line 354 also communicates with and terminates at a port 386 in the rear housing 14 which is axially aligned with the flat head 194 of the adjustment screw 192. The various pneumatic lines noted above may be formed in the front housing 12, the rear housing 14, the bulkhead 80 or may be one of the pneumatic lines interconnecting the rear housing 14 and the bulkhead 80, illustrated in FIG. 1.

Figure 9:
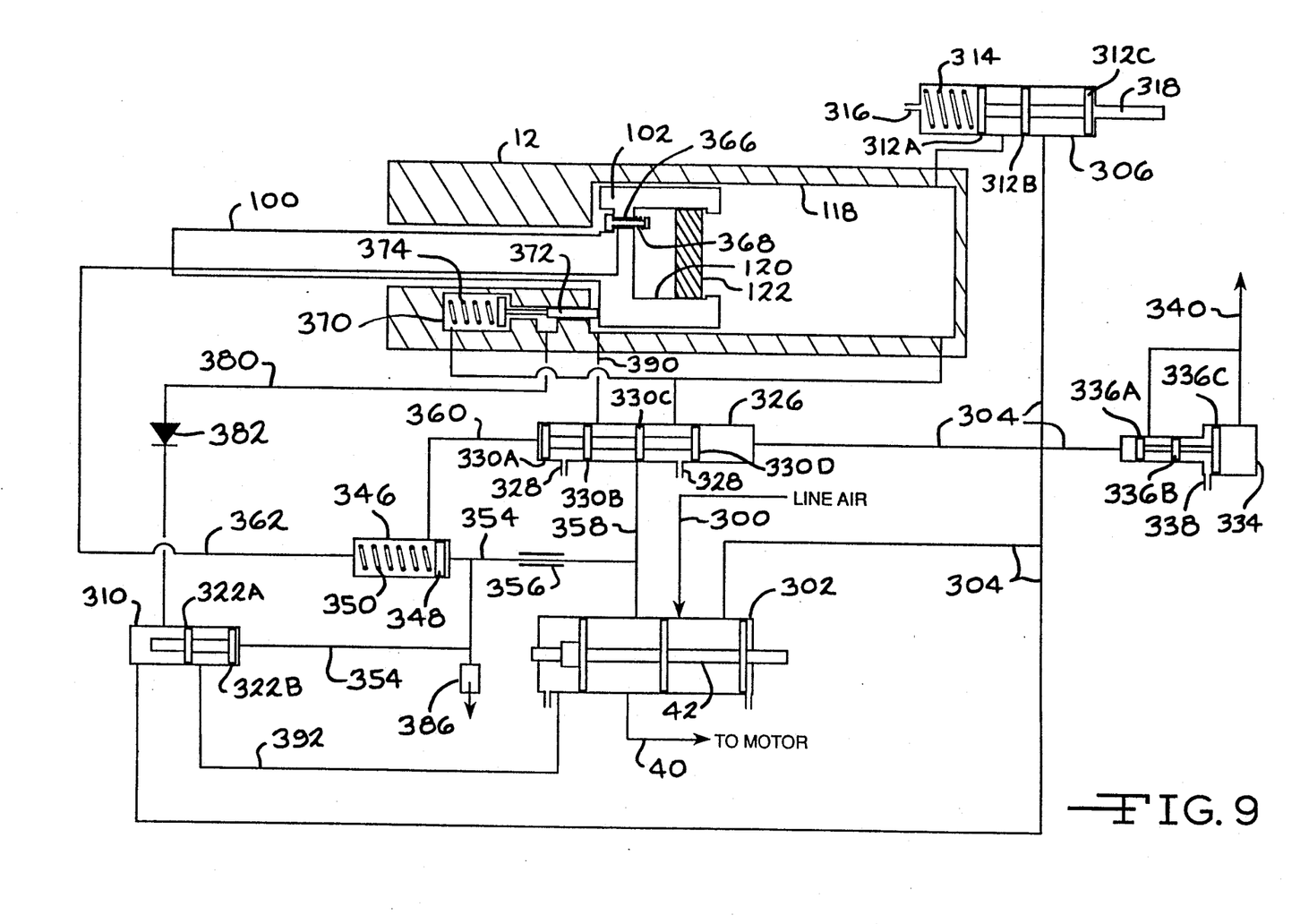
FIG. 9 is a diagrammatic view of the pneumatic control circuitry of a peck feed drilling machine according to the present invention.

Referring now to FIGS. 2 and 9, the operation of the peck feed drilling machine 10 will be described. FIG. 9 represents the peck feed drilling machine pneumatic circuitry in an off or standby position. As such, the shop air supplied in the line 300 to the on-off valve 302 is coupled to the line 304 thereby setting the shuttle of the shut-off valve 310 to the right as illustrated in FIG. 9 and the shuttle of the feed control valve 326 to the left as illustrated in FIG. 9. These shuttles are thus properly positioned to receive signals during the operating cycle. The pressure regulator 334 provides pressure in the line 340 to the primary feed rate assembly 18 which is approximately thirty-nine percent of line pressure due to the ratio of the diameters of the spools 336A, 336B and 336C. When air in the pressure range of 30-40 p.s.i. is supplied to the feed control dashpot 106, an internal brake (not illustrated) is released and the feed control rod 114 fully extends.

To commence operation, the on-off valve shuttle 42 is moved to the left. Compressed air is then provided to the vane motor 36 and associated equipment through the line 40. Compressed air is likewise supplied in the line 358 through the feed control valve 326 through the line 390 to the chamber behind the feed piston 102 and also through the restriction 356 and the line 354 to the port 386.

At this time, feed air travels through the passageway 128 and into the chamber 148 adjacent the peck clutch piston 140. The peck clutch assembly 130 is therefore activated and the peck clutch piston 140 clamps to the feed control rod 114. The feed control rod 114 abuts and is restrained by the fitted screw 172. As the feed piston 102 advances, the gap between the feed piston 102 and the peck piston 122 lessens. As the feed piston 102 approaches the peck piston 122, the peck valve 366 opens allowing air to travel from the face of the feed piston 102 along the line 362 which is in fact clearance between the dashpot 106 and the elongate housing 100 through the retract shuttle valve 346. The pressurized air signal is then carried in the line 360 to the feed control valve 326 where it translates the shuttle of this valve to the right or retract position.

In the retract cycle, pressurized air is once again supplied to the line 358 but the spools 330B and 330C of the feed control valve 326 direct the pressurized air to the line 376 and into the chamber 118 and to the chamber of the forward retract valve 370 as well. During the retract portion of the cycle, air pressure is released behind the peck clutch piston 140. The compression springs 142 release the peck clutch assembly 130 thus freeing the feed control rod 114. As the feed piston 102 returns to the fully retracted or left most position illustrated in FIGS. 2 and 9, the register pin 154 contacts the peck adjustment screw 158 and causes the peck piston 122 to move forward on the feed control rod 114.

When the feed piston 102 has fully retracted, the full retract valve 370 opens and sends a signal through the line 380 and the check valve 382 to the shut-off valve 310. A signal passes through the shut-off valve 310 and into the line 304 and to the feed control valve 326 where it returns the shuttle of the feed control valve 326 to the left. This cycle repeats until the head 194 of the threaded adjustment screw 192 closes off the port 386 indicating that full stroke drilling depth has been reached. When the port 386 is blocked, pressure rises in the line 354 causing the shuttle 348 of the retract shuttle valve 346 to move against the compression spring 350 and provide pressurized air in the line 360 to the feed control valve 326, translating the shuttle of this valve to the right. Also, as pressure builds in the line 354, the shuttle of the shut-off valve 310 translates to the left. So configured, pressurized air is again provided in the line 376 to the chamber 118 to retract the feed piston 102. When the feed piston 102 is fully retracted, the full retract valve 370 is activated supplying air in the line 380 through the shut-off valve 310 and through a line 392 to the on-off valve 302 to translate the shuttle 42 to the right or off position.

The manual retract valve 306 allows manual override and return of the feed piston 102 to the position illustrated in FIGS. 2 and 9 at any time the on-off valve 302 is in the off position. Activation of the manual retract valve 306 supplies pressurized air from the line 304, through the line 320 and into the chamber 118 thereby retracting the feed piston 102 as will be readily appreciated.

The foregoing disclosure is the best mode devised by the inventors for practicing this invention. It is apparent, however, that apparatus incorporating modifications and variations will be obvious to one skilled in the art of pneumatic drilling tools. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A peck feed drilling apparatus comprising, in combination,
    means for rotating a drill bit,
    means for advancing and retracting said drill bit, including
    a feed rate control having a translating rod,
    a feed piston disposed for translation within a chamber and defining a peck cylinder,
    a peck piston disposed for translation within said peck cylinder, a clutch operably disposed between said translating rod and said peck piston, and control means for cycling said advancing and retracting means.

2. The peck feed drilling apparatus of claim 1 further including a spring means engageable by said translating rod for cushioning translation of said translating rod.

3. The peck feed drilling apparatus of claim 1 further including dashpot means for providing adjustable resistance during the final machining on a workpiece.

4. The peck feed drilling apparatus of claim 1 further including a depth stop adjusting means having a coarse adjustment including a threaded member received in a complementally threaded sleeve and a fine adjustment including a shaft with regions of two thread pitches, a first of said regions having threads received in and complemental to said threaded sleeve and the second of said regions having threads of a pitch distinct from said first threads and received in a threaded bushing.

5. The peck feed drilling apparatus of claim 1 wherein said means for rotating a drill bit includes a pneumatic motor and speed reduction assembly and said control means includes a plurality of pneumatic valves, one of said valves having means for both manually and pneumatically translating said one of said valves between a first position wherein air is provided to said pneumatic motor and a second position wherein air is not provided to said pneumatic motor.

6. The peck feed drilling apparatus of claim 1 wherein said clutch includes a peck clutch piston and means for selectively coupling said peck clutch piston to said translating rod.

7. The peck feed drilling apparatus of claim 1 wherein said clutch includes a peck clutch piston having a frusto-conical surface and means for clamping disposed between said frusto-conical surface and said translating rod.

8. A peck feed machine comprising, in combination, means for rotating a tool, means for advancing and retracting said tool rotating means relative to a workpeice, including a feed piston operably coupled to said means for rotating and disposed for translation within a housing defining a feed cylinder, a peck piston defining an aperture and disposed for translation within a peck cylinder, a feed control dashpot operably disposed between said housing and said tool rotating means and having a rod extending through said aperture and clutch means for selectively coupling said peck piston to said rod and fluid control means for cycling said advancing and retracting means.

9. The peck feed machine of claim 8 wherein said means for rotating a tool is a pneumatic motor operably coupled to a speed reducing assembly.

10. The peck feed machine of claim 8 further including a second housing defining an opening for securely receiving said means of rotating a tool, said housing defining an opening for slidably receiving said means for rotating a tool.

11. The peck feed machine of claim 8 wherein said fluid control means includes an on-off valve for selectively supplying compressed air to said means for rotating a tool and fluid control components, said fluid control components including means for sensing attainment of full machining depth and means for effecting manual retraction of said tool.

12. The peck feed machine of claim 8 wherein said fluid control means includes an on-off spool valve having a stem adapted for manual movement between a first, operating position and a second, non-operating position and signal responsive means coupled to said stem for translating said stem to said second, non-operating position.

13. The peck feed machine of claim 8 further including a second housing having a first opening for receiving and retaining said means for rotating a tool, a second opening for receiving said feed control dashpot, an adjacent wall, a slot extending from said second opening to said adjacent wall and means extending across said slot for selectively enlarging said second opening to facilitate repositioning of said feed control dashpot.

14. The peck feed machine of claim 8 further including means for resisting the advance of said tool as it approaches the surface to be machined during a peck cycle.

15. The peck feed machine of claim 14 wherein said means for resisting includes resilient means engaged by said rod.

16. The peck feed machine of claim 14 wherein said means for resisting includes at least one Belleville spring.

17. The peck feed machine of claim 8 further including adjustable dashpot means for providing resistance opposing the advance of said tool proximate the position of tool breakthrough or countersinking.

18. The peck feed machine of claim 8 further including adjustable depth stop means having a first adjustment including a threaded member received in a complementally threaded sleeve and a second adjustment including a threaded member having a first region of threads complemental to said threads in said threaded sleeve and received therein and a second region of threads of a pitch distinct from said first threads, said second region of threads received in a complementally threaded bushing.

19. The peck feed machine of claim 8 wherein said feed control dashpot includes a pneumatically operated clutch.

20. The peck feed machine of claim 8 further including movable stop means engageable by said peck piston for adjusting the depth of cut of a peck cycle.

21. The peck feed machine of claim 20 wherein said movable stop means is a threaded rod.

22. A peck feed drilling apparatus comprising, in combination, pneumatic drive means for receiving and rotatably driving a drill bit, said drive means having a first housing, a feed rate control having a second housing coupled to said first housing, a feed piston coupled to said second housing and disposed in a feed cylinder and a rod extending from said feed rate control into said feed cylinder, said feed piston defining a peck cylinder having a peck piston disposed therein, said peck piston defining an opening for receiving said feed control rod, a pneumatically operated clutch for selectively coupling and decoupling said peck feed piston and said feed control rod, and pneumatic control means for cyclically advancing and retracting said drill bit.

23. The peck feed drilling apparatus of claim 22 wherein said first housing includes a passageway for providing cutting lubricant to said drill bit.

24. The peck feed drilling apparatus of claim 22 wherein said pneumatic control means includes a plurality of pneumatic valves, at least one of said plurality of valves being both manually and pneumatically operable, at least another of said plurality of valves actuated by said feed piston and still another of said plurality of valves actuated by said peck piston.

25. The peck feed drilling apparatus of claim 22 further including dashpot means for providing adjustable resistance to the advance of said drill bit during the final machining on a workpiece.

26. The peck feed drilling apparatus of claim 22 wherein said pneumatic control means includes a bleed port and an adjustable depth stop aligned with said bleed port.

27. The peck feed drilling apparatus of claim 22 further including first means for resisting advance of said drill bit as it approaches the previously drilled surface during a peck cycle and second means for resisting advance of said drill bit during the final machining.

28. A peck feed tool operating on a repeating advance, machine by distance, retract cycle comprising, in combination,
  means for rotating a tool, and
  means for advancing and retracting said tool rotating means including,
    a feed rate control,
    a feed piston disposed for translation within a feed cylinder,
    a peck piston disposed for translation within a peck cylinder,
    an on-off valve having a first, operating position and a second, non-operating position, manually engageable means for selectively positioning said on-off valve in said first or said second position and means for translating said on-off valve to said second position in response to a pneumatic signal,
    a control valve in fluid communication with said on-off valve and movable between a first, tool advancing position and a second, tool retracting position,
    peck valve means for sensing the completion of the machining step of said repeating cycle and providing a pneumatic signal to said control valve to move said control valve to said first, tool retracting position,
    retract valve means for sensing completion of the retract step of said repeating cycle and providing a signal to said control valve to move said control valve to said first, tool advancing position,
    means for sensing attainment of desired machining depth by said tool, and
    shut off valve means in fluid communication with said attainment sensing means for providing said pneumatic signal.

29. The pneumatic control system of claim 28 wherein said attainment sensing means includes a bleed port.

30. The pneumatic control system of claim 28 further including a manually operable valve for effecting full retraction of said tool.

31. The peck feed apparatus of claim 28 further including means for adjusting the depth of the drilling stop of a peck cycle.

32. The peck feed apparatus of claim 31 wherein said adjusting means includes a threaded adjustment rod cooperating with said peck piston.

33. In a peck feed drilling machine having a motor output for coupling to a drill bit or other machining tool and a reciprocating drive mechanism for cyclically advancing and retracting said machining tool, the improvement comprising,
  a feed rate control having an axially translating rod extending therefrom,
  peck piston means for establishing the distance of the machining step of each peck cycle,
  clutch means for selectivley coupling said peck piston to said rod, and
  spring means engageable by said rod for retarding translation of said machining tool prior to the commencement of said machining step of a peck cycle.

34. The improvement of claim 33 wherein said spring means is a Belleville spring.

35. A peck by distance machine comprising, in combination,
  a machine housing,
  drive means slidably received in said machine housing for receiving and rotating a tool,
  translating means disposed in said machine housing and coupled to said drive means for bi-directionally translating said drive means relative to said machine housing,
  peck by distance means disposed in said housing and coupled to said drive means for controlling said bi-directional translation of said drive means,
  said peck by distance means including
    a feed control operably disposed between said drive means and said machine housing and having a housing and a translating rod extending therefrom,
    peck means disposed in said machine housing for advancing said drive means a preselected peck distance each peck cycle,
    clutch means for selectively coupling said peck means to said translating rod and
  control means operatively associated with said translating means and said peck by distance means for cyclically, bi-directionally translating said drive means relative to said machine housing.

36. The peck by distance machine of claim 35 further including for means for adjusting at least one limit of translation of said peck means.

37. The peck by distance machine of claim 35 further including resilient means operably disposed between said translating rod and said drive means for cushioning contact therebetween.

38. The peck by distance machine of claim 37 wherein said resilient means is a Belleville spring.

39. The peck by distance machine of claim 35 further including adjustable dashpot means for providing resistance opposing the advance of said drive means proximate the position of tool breakthrough or countersinking.

40. The peck by distance machine of claim 35 wherein said control means is pneumatic and includes a plurality of pneumatic valves, at least one of said plurality of valves being both manually and pneumatically operable, at least another of said plurality of valves actuated by said translating means and still another of said plurality of valves actuated by said peck piston.

* * * * *